ated in the left side and is connected with
UNITED STATES PATENT OFFICE.

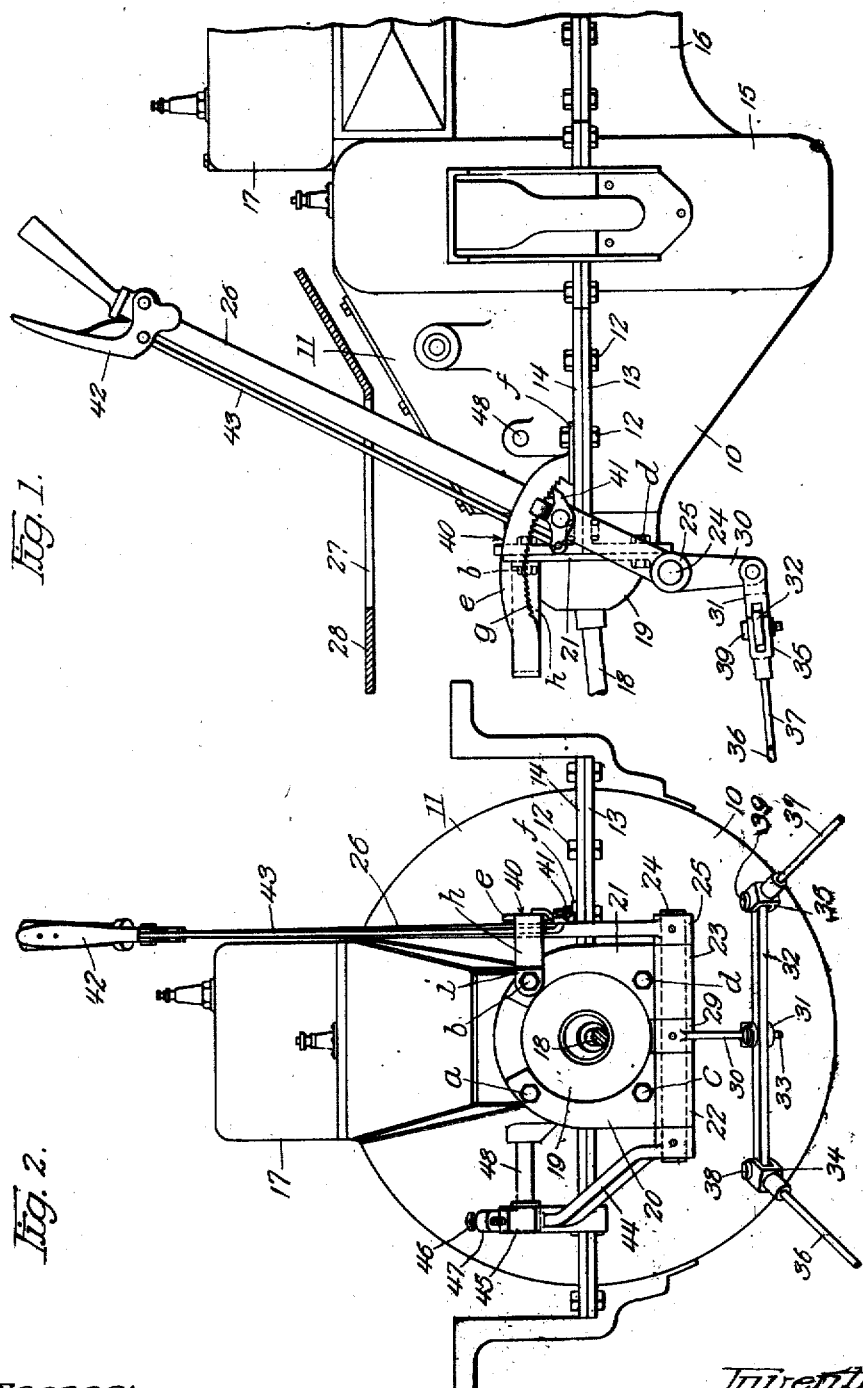

HOWARD A. BAKER, OF EL PASO, TEXAS.

BRAKE-ACTUATING MECHANISM FOR AUTOMOBILES.

1,315,454.    Specification of Letters Patent.    Patented Sept. 9, 1919.

Application filed November 30, 1917. Serial No. 204,541.

*To all whom it may concern:*

Be it known that I, HOWARD A. BAKER, a citizen of the United States, and a resident of El Paso, in the county of El Paso and State of Texas, have invented certain new and useful Improvements in Brake-Actuating Mechanism for Automobiles, of which the following is a specification.

My invention relates to improved brake actuating mechanism for automobiles particularly adaptable for use in Ford cars for controlling the operation of the emergency brakes.

In Ford cars the emergency brake hand lever is at the left of the body in front of the driver in the left side and is connected with a transverse pivot rod from which lever arms extend at the ends for connection with the respective pull rods leading to the emergency brakes. No provision is made for compensation, the pull rods being pulled equal distances when the hand lever is operated. This prevents efficient braking as one brake may catch while the other will not. One of the important objects of my invention is therefore to provide improved brake actuating lever mechanism which is compensating. Another object is to provide for supporting such lever mechanism in a position to permit the hand lever to extend up to be at the right of the driver. Another object is to provide such construction that the supporting mechanism for the hand lever may be secured entirely by means of bolts already present on the Ford car thus eliminating the necessity of drilling other holes or providing special supports or fastening means. In accordance with my invention I fasten supporting brackets or plates to the inner end of the transmission case housing, using the same screws or bolts which fasten the universal drive shaft joint to the transmission case housing. This forms a very rigid support in convenient position to permit the hand brake lever to be more at the center of the car in position to be operated with the right hand.

On the accompanying drawing my improved construction and arrangement is clearly illustrated. On this drawing—

Figure 1 is a side view of the transmission case housing and engine housing showing my attachment applied, and Fig. 2 is an end elevational view.

10 represents the transmission case housing body and 11 the cover therefor, these two parts being connected together by bolts 12 passing through the flanges 13 and 14. 15 represents the fly wheel housing, 16 the crank case housing and 17 the engine frame. The drive shaft 18 is connected with the transmission mechanism within the transmission housing by universal coupling mechanism which is held in place by a cap 19 secured to the inner end of the transmission housing by means of four bolts *a*, *b*, *c* and *d*. These four bolts I utilize for also supporting my attachment. As shown, this attachment comprises two similar supporting plates 20 and 21 which are substantially semi-circular to engage with the sides of the semi-spherical cap 19, and these plates have bolt holes for registering with the holes which receive the bolts *a*, *b*, *c* and *d*. To apply the plates all that is necessary is to remove these bolts and re-apply them to include the plates. At the lower ends of these plates are bearing lugs or sleeves 22 and 23 respectively which pivot a shaft 24. To the right end of this shaft is secured the hub 25 from which the emergency brake hand lever 26 extends upwardly, the slot 27 being provided in the floor 28 of the car for the lever. Between the bearing lugs 22 and 23 the shaft 24 has secured thereto the hub 29 from which the arm 30 extends downwardly and terminates in the bifurcated end 31 in which the bar 32 is pivoted by means of a bolt or pin 33. By means of clevis fittings 34 and 35 the vehicle brake pull rods 36 and 37 are pivoted to the bar ends by pins 38 and 39. With this arrangement, when the brake lever is swung rearwardly, the arm 30 will be swung forwardly to carry with it the bar 32 and as this bar is pivoted the pull will be distributed to the brake pull rod in such manner that both emergency brakes will be tightened. If one brake becomes tightened before the other, then the balance of pull is transmitted to the other brake until it becomes tightened, efficient braking being thus possible.

In order to lock the brake lever in any position I provide ordinary ratchet locking mechanism comprising a suitable ratchet rack plate 40 and a ratchet pawl 41, the pawl being pivoted on the brake lever and connected with the grip fitting 42 by the rod 43. The rack member I use is of such shape that it can be applied without requiring special support or securing means such as screws or bolts. The device shown is of U-shape, the one limb $e$ being arcuate and in a vertical plane with its front end $f$ in a horizontal plane to form a foot for resting on top of the flange 14 of the transmission housing body 11, and this foot is provided with a bolt hole for registering with one of the bolt holes for the bolts 12 which secure the transmission case cover to the body. As shown, the bolt nearest the inner end of the transmission housing is utilized for receiving the rack member. When thus secured the arcuate part of the limb $e$ has its center at the center of shaft 24 on which the brake lever is secured and the pawl 41 is pivoted in position to engage with the teeth $g$. To further secure the rack member its other limb $h$ is extended laterally at its end to form a foot $i$ which is provided with a bolt hole for receiving the bolt $b$ which receives the supporting plate 21 for the shaft 24.

In the ordinary construction and arrangement of Ford cars a kick-off lever or arm extends from the pivot rod to which the emergency brake arm is secured, such kick-off arm serving to throw the high speed clutch out of connection when the emergency brakes are locked. In my construction the kick-off arm or lever 44 is secured at its lower end to the left end of the shaft 24 and and at its upper end has a cam 45 for engaging with the abutment screw 46 on the clutch lever 47 which extends from the clutch shaft 48. If the high speed clutch is in when the emergency brake lever 26 is swung to tighten the brakes, the arm 44 will swing and bring its cam plate into engagement with the set screw to swing the clutch lever into neutral position.

My attachment is of simple and inexpensive construction. The same brake lever can be used and the only new parts necessary are the supporting plates 20 and 21 together with the shaft and the equalizer bar 32. It is unnecessary to drill new bolt or screw holes or to move or remove any of the vehicle parts. The plates 20 and 21 are merely slipped over the joint cap 19 in position to receive the bolts $a$, $b$, $c$ and $d$, while the rack member is positioned to receive the bolt $b$ and one of the bolts 12. When the nuts are applied to these bolts the attachment is in place and rigidly secured. The brake pull rods are then pivoted to the ends of the equalizer bar 32 and the attachment is ready for operation. If the invention were utilized in the construction of Ford cars it would reduce the expense and create a considerable saving for it would eliminate the special fittings which were necessary in the old construction to support the brake lever pivot rod and would eliminate the labor necessary to drill bolt holes for these fittings and the labor for applying the fittings. Furthermore, it would permit placing the brake lever more in the center of the car and away from the car door, making it then more convenient for entering or leaving the car at the driver's seat.

I do not desire to be limited to the exact construction and arrangement shown and described as changes are no doubt possible which would still come within the scope of the invention.

I claim as follows:

1. In an automobile, the combination with the transmission housing and transmission mechanism therein, a drive shaft extending rearwardly from said housing, a universal joint connecting said shaft with said transmission mechanism, an inclosing cap for said joint, and bolts securing said cap against the inner end of said housing, of a supporting plate having bolt holes for receiving said bolts to be thereby secured against the end of said housing, a cross shaft journaled on said plate, a brake lever extending upwardly from said cross shaft to control the rotation thereof, an arm secured to and extending downwardly from said cross shaft, a bar pivoted at an intermediate point to said arm, and brake pull rods extending rearwardly from the bar ends.

2. In an automobile, the combination with a transmission housing body and a cover therefor, bolts for securing said cover to the body, transmission mechanism within the housing, a drive shaft extending rearwardly from said housing, a coupling connecting the front end of said shaft with said transmission mechanism, an inclosing cap for said coupling, bolts for securing said cap to the inner end of said housing body and cover, of a supporting bracket structure having an opening for receiving said cap and having bolt holes for receiving the same bolts which secure the cap to the housing whereby said structure may be detachably secured to the housing, a cross shaft journaled on said bracket structure, a brake lever extending upwardly from said cross shaft, a pawl pivoted on said lever and actuating mechanism therefor on said lever, a rack member for coöperating with said pawl to lock the lever end in position, one end of said rack member having a bolt hole for receiving one of the bolts which secure the bracket structure and cap to the transmission housing, the other end of said rack member having a bolt hole for receiving one of the bolts which secures the transmission housing and body together, an arm extending downwardly from said cross shaft, rake pull rods and a bar pivoted at its ends to the front ends of said pull rods and pivoted intermediate its ends to said arm.

In witness whereof, I hereunto subscribe my name this 24th day of November, A. D., 1917.

HOWARD A. BAKER.